United States Patent
Zheng

(10) Patent No.: US 10,257,362 B2
(45) Date of Patent: Apr. 9, 2019

(54) VOICE GATEWAY

(71) Applicants: Xinming Zheng, Hefei (CN); Shu Zhou, Nanjing (CN)

(72) Inventor: Xinming Zheng, Hefei (CN)

(73) Assignees: Shu Zhou, Nanjing (CN); Xinming Zheng, Hefei (CN)

( * ) Notice: Subject to any disclaimer, the term of this patent is extended or adjusted under 35 U.S.C. 154(b) by 0 days.

(21) Appl. No.: 15/564,813

(22) PCT Filed: Jan. 25, 2017

(86) PCT No.: PCT/CN2017/072547
§ 371 (c)(1),
(2) Date: Oct. 6, 2017

(87) PCT Pub. No.: WO2017/133607
PCT Pub. Date: Aug. 10, 2017

(65) Prior Publication Data
US 2018/0109683 A1  Apr. 19, 2018

(30) Foreign Application Priority Data
Feb. 5, 2016 (CN) .......................... 2016 1 0084384

(51) Int. Cl.
*H04M 7/00* (2006.01)
*H04W 8/18* (2009.01)
*H04W 88/16* (2009.01)

(52) U.S. Cl.
CPC ......... *H04M 7/0069* (2013.01); *H04W 8/183* (2013.01); *H04W 88/16* (2013.01)

(58) Field of Classification Search
CPC ............................. H04M 7/0069; H04W 88/16
(Continued)

(56) References Cited

U.S. PATENT DOCUMENTS

2001/0049604 A1* 12/2001 Ito .......................... G10L 15/22
704/270.1
2004/0001482 A1* 1/2004 Yeom ................ H04L 29/06027
370/356
(Continued)

FOREIGN PATENT DOCUMENTS

CN   1568068 A   1/2005
CN   1838680     9/2006
(Continued)

OTHER PUBLICATIONS

International Search Report dated Mar. 30, 2017 from application serial No. PCT/CN2017/072547.
(Continued)

*Primary Examiner* — Ayodeji O Ayotunde
(74) *Attorney, Agent, or Firm* — Hogan Lovells US LLP

(57) ABSTRACT

Provided is a voice gateway, which in communication with at least one mobile terminal. The voice gateway includes: a terminal connection module configured to establish communication with the mobile terminal; a processor connected with the terminal connection module and configured to process a voice or data service request initiated by the mobile terminal; and a communication module connected with the processor and configured to communicate, according to the voice or data service request, with an external network. The mobile terminal can select a number from the voice gateway as the number to initiate the voice or data service request, and the voice gateway establishes, according to the voice or data service request, voice or data communication with a called party or an external network. Therefore, the mobile terminal can carry out voice or data service communication not only with a local number, but also through the voice gateway.

10 Claims, 3 Drawing Sheets

(58) Field of Classification Search
USPC .................................................. 455/554.1
See application file for complete search history.

(56) References Cited

U.S. PATENT DOCUMENTS

| | | | | |
|---|---|---|---|---|
| 2007/0070948 | A1* | 3/2007 | Kezys | ................. H04L 12/6418 |
| | | | | 370/331 |
| 2007/0206568 | A1* | 9/2007 | Silver | .................. H04W 76/10 |
| | | | | 370/352 |
| 2008/0247520 | A1 | 10/2008 | Scott | |
| 2016/0072954 | A1* | 3/2016 | Newberry | ............... H04M 3/54 |
| | | | | 370/259 |

FOREIGN PATENT DOCUMENTS

| | | |
|---|---|---|
| CN | 101600266 | 12/2009 |
| CN | 101600266 A | 12/2009 |
| CN | 103107975 A | 11/2011 |
| CN | 102546998 | 7/2012 |
| CN | 103582177 A | 7/2012 |
| CN | 105592239 | 5/2016 |
| CN | 205566446 | 9/2016 |

OTHER PUBLICATIONS

CN First Office Action issued in Application Serial No. 201610084384.9 dated May 3, 2018 (from priority application).
CN First Search issued in Application Serial No. 201610084374.9.
English translation of Abstracts of Foreign Patent Documents.

* cited by examiner

VOICE GATEWAY

CROSS-REFERENCE TO RELATED APPLICATION

The present application claims priority to International Application No. PCT/CN2017/072547 filed Jan. 25, 2017, entitled "Audio Gateway" which claims priority to Chinese patent application Application No. 201610084384.9, filed on Feb. 5, 2016, and entitled "Voice Gateway", which is incorporated herein by reference in its entirety.

TECHNICAL FIELD

The present invention relates to the field of communication technology, and particularly to a voice gateway.

BACKGROUND ART

In the existing communication technology, a user might need to use a plurality of different phone numbers to meet requirements of work and daily life, in which landline telephones or mobile phones are involved. Due to the limitation of mobile terminals, only Dual SIM Dual Standby can be generally realized. If the user wants to use more phone numbers, more mobile terminals have to be used, which is inconvenient for the user to use. Moreover, the landline telephone can only be used for fixed installations, and if there is a need to use it in other places, this can only be done by means of such as call forwarding. Existing communication methods cannot meet the requirement that the user uses multiple telecommunication numbers at the same time. As a result, it is necessary to develop a device enabling one mobile terminal to use multiple telecommunication numbers.

DISCLOSURE OF THE INVENTION

In view of this, an object of embodiments of the present invention is to provide a voice gateway, so as to solve the above-mentioned problem.

The technical solution provided by the present invention is as follows.

A voice gateway is provided, where the voice gateway is in communication with at least one mobile terminal, and the voice gateway includes:
- a terminal connection module, configured to establish communication with the mobile terminal;
- a processor connected with the terminal connection module and configured to process a voice or data service request initiated by the mobile terminal; and
- a communication module connected with the processor and configured to communicate, according to the voice or data service request, with an external network.

Furthermore, the communication module includes a mobile phone communication unit and a landline telephone communication unit, where
- the landline telephone communication unit is configured to establish communication with a public switched telephone network; and
- the mobile phone communication unit is configured to establish communication with a mobile communication network.

Furthermore, the landline telephone communication unit is configured to communicate with the public switched telephone network through a foreign exchange office (FXO) interface.

Furthermore, the mobile phone communication unit includes a plurality of slots for subscriber identity module (SIM) cards.

Furthermore, the communication module further includes:
- a network telephone communication unit configured to connect with Public Internet, so as to realize network telephone communication.

Furthermore, the communication module is further configured to receive an incoming-call request directed against the voice gateway; and the terminal connection module is further configured to forward the incoming-call request to the mobile terminal.

Furthermore, the terminal connection module is connected with the mobile terminal via a wireless local area network, Bluetooth or a mobile communication network.

Furthermore, it further includes a memory connected with the processor.

Furthermore, it further includes a display module connected with the processor and configured to display information stored in the memory.

Furthermore, it further includes a power supply module configured to supply power to each of the processor, the communication module and a network connection module.

Compared with the prior art, according to the present invention, the mobile terminal can carry out communication by means of the voice gateway. The voice gateway is provided thereon with a communication module, and the mobile terminal can select, from the voice gateway, a number desired to be used as the number for initiating a voice or data service request. The mobile terminal selects this number and initiates the voice or data service request, the voice gateway establishes, according to the voice or data service request initiated by the mobile terminal, communication with a called party or an external network via the communication module. In this way, the mobile terminal can not only carry out voice or data service communication by using a local number, but also realize the voice or data service communication by means of the voice gateway. More communication modes are provided, which makes it possible to satisfy users' demands for more communication modes, thereby improving the user experience.

To make the above-mentioned object, features and advantages of the present invention clearer and easier to understand, preferred embodiments are given below and explained in detail in conjunction with the accompanying drawings.

BRIEF DESCRIPTION OF THE DRAWINGS

In order to more clearly explain technical solutions of embodiments of the present invention, the drawings to be used in the embodiments will be briefly introduced below. It shall be understood that, the following drawings merely show some embodiments of the present invention, and thus shall not be deemed as limiting the scope. For a person skilled in the art, other relevant drawings can also be obtained in view of these drawings without inventive efforts.

DETAILED DESCRIPTION OF THE EMBODIMENTS

Figure 1:
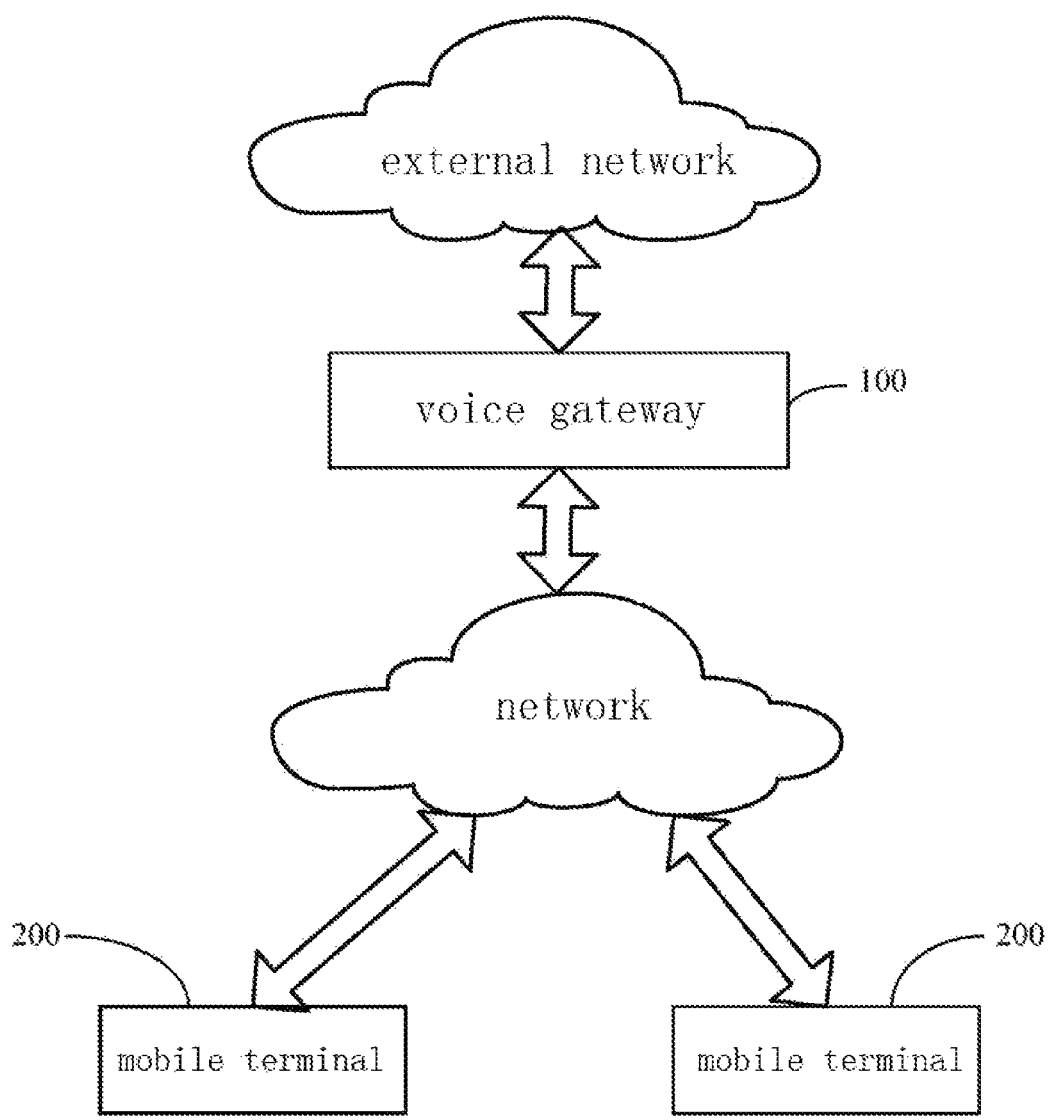
FIG. 1 is a schematic diagram showing the interaction between mobile terminals and a voice gateway provided by a preferred embodiment of the present invention.

Below, the technical solutions in the embodiments of the present invention will be clearly and completely described in conjunction with the drawings in the embodiments of the present invention. Apparently, the described embodiments are merely part rather than all of the embodiments of the present invention. Components of the embodiments of the present invention, as described and shown in the drawings herein, can generally be arranged and designed in various different configurations. Thus, the following detailed description of the embodiments of the present invention provided in the drawings is not intended to limit the scope of the present invention for which protection is sought, and instead, it merely represents selected embodiments of the present invention. All the other embodiments, which could be obtained by a person skilled in the art based on the embodiments of the present invention without inventive efforts, would fall within the scope of protection of the present invention.

It shall be noted that, similar reference signs and letters represent similar items in the following figures; and thus, once one certain item is defined in one figure, no further definitions or interpretations need to be made about this item in subsequent figures. Moreover, in the description of the present invention, terms "first" and "second" and the like are merely used for differential description, and cannot be construed as indicating or implying importance in relativity.

In the description of the present invention, it shall be clarified that orientational or positional relationships indicated by terms, such as "central", "upper", "lower", "left", "right", "vertical", "horizontal", "inner" and "outer", are based on orientational or positional relationships shown in the figures, and merely serve for facilitating the description of the present invention and simplifying the description, rather than indicating or implying that the indicated apparatus or element must be in a specified orientation or have to be constructed and operated in a specified orientation, and thus these terms cannot be construed as limiting the present invention. In addition, terms such as "first", "second" and "third" are merely used for the purpose of description, and cannot be construed as indicating or implying importance in relativity.

In the description of the present invention, it shall be clarified that, terms such as "mount", "connect" and "connection" shall be construed in a broad sense, unless it is otherwise specifically specified and defined. For example, it may be a fixed connection, or a detachable connection, or an integrated connection; it may be a mechanical connection, or an electrical connection; and it may be a direct connection, or an indirect connection via an intermediate, or may also be an inner communication between two elements. For a person skilled in the art, the specific meanings of the above-mentioned terms in the present invention could be construed according to specific circumstances.

Figure 2:
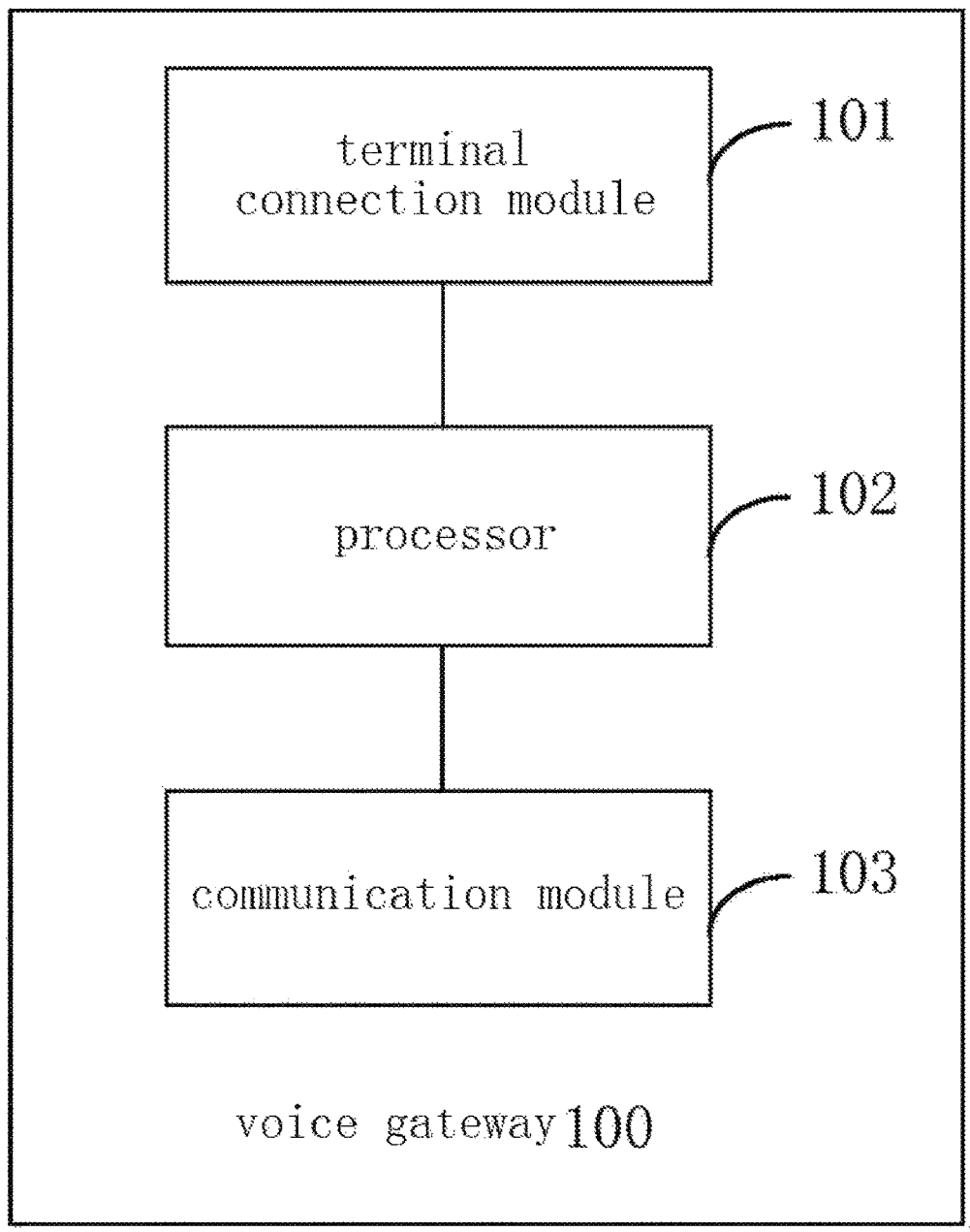
FIG. 2 is a schematic diagram showing modules of a voice gateway provided by a preferred embodiment of the present invention.
Figure 3:
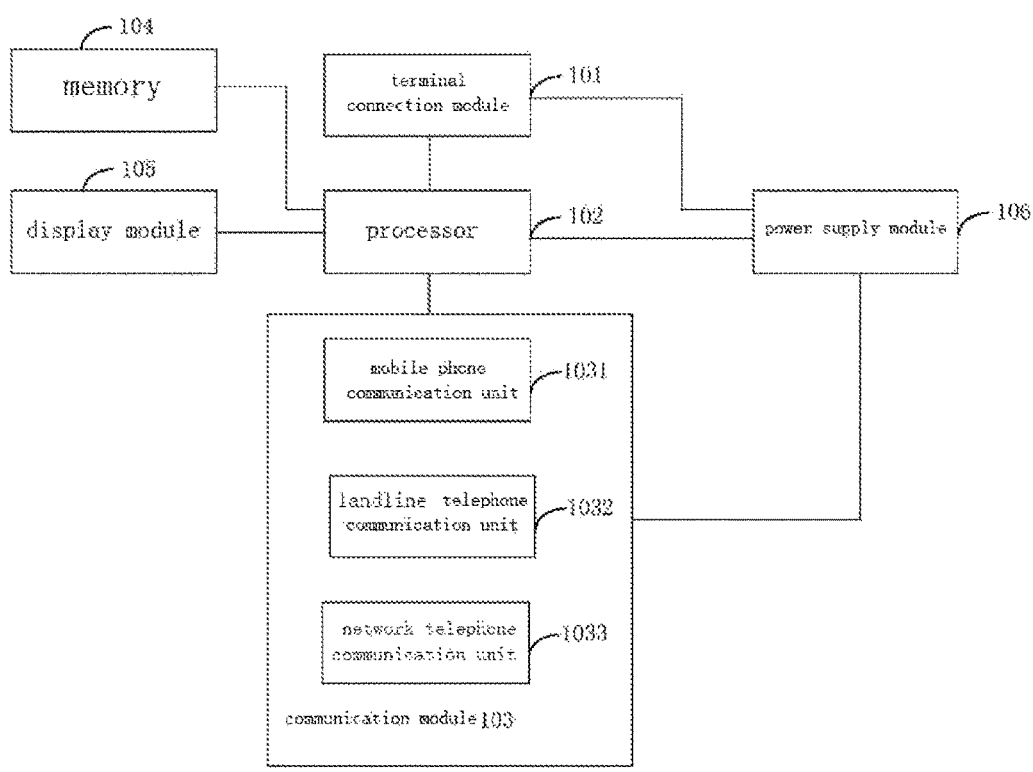
FIG. 3 is a schematic diagram showing modules of another voice gateway provided by a preferred embodiment of the present invention.

The embodiments of the present application provide a voice gateway 100. As shown in FIGS. 1, 2 and 3, the voice gateway 100 is in communication with at least one mobile terminal 200, and the voice gateway 100 includes a terminal connection module 101, a processor 102 and a communication module 103.

The mobile terminal 200 may be a smartphone, a Mobile Internet Device (MID), a Personal Digital Assistant (PDA), a tablet computer and the like. After being connected with the voice gateway 100, the mobile terminal 200 can carry out communication by means of the voice gateway 100. If a voice or data service request needs to be made, the mobile terminal 200 can forward this voice or data service request to the voice gateway 100, without carrying out communication directly via the mobile network of a mobile operator; and the voice gateway 100 then sends this voice or data service request to an external network, thereby establishing communication for an outgoing call by means of the voice gateway 100. Moreover, as to an incoming-call request directed against the mobile terminal 200 that comes from the external network, it may not also go through the mobile operator, but the incoming-call request coming from the external network is transferred by the voice gateway 100 to the mobile terminal 200, thereby realizing communication for an incoming call.

The terminal connection module 101 is connected with the processor 102, and is configured to establish communication with the mobile terminal 200, to receive the voice or data service request. The processor 102 is configured to process the voice or data service request initiated by the mobile terminal 200.

The terminal connection module 101 may connect with the mobile terminal 200 by utilizing a communication mode, such as a wireless local area network, a General Packet Radio Service (GPRS) technology, Bluetooth, the third generation mobile communication technology (3G) or the fourth generation mobile communication technology (4G). With these data transmission modes, the mobile terminal 200 can be connected with the voice gateway 100, and can receive voice data, image data and the like in a call.

The communication module 103 is connected with the processor 102, and is configured to communicate with the external network according to the voice or data service request.

In an embodiment of the present application, the communication module 103 may include a mobile phone communication unit 1031 and a landline telephone communication unit 1032. The mobile phone communication unit 1031 is configured to establish communication with a mobile communication network, and the landline telephone communication unit 1032 is configured to establish communication with a public switched telephone network. The mobile phone communication unit 1031 is such a unit that uses a mobile telecommunication number. If the mobile terminal 200 selects the mobile phone communication unit 1031 to initiate a voice or data service request, the finally established communication is accomplished by means of the mobile telecommunication number, and the number displayed on the called party is the number of the communication module 103 in the voice gateway 100, rather than the number of the mobile terminal 200.

Likewise, if the mobile terminal 200 selects, when making an outgoing call, the landline telephone communication unit 1032 to carry out communication, the established communication is realized via the public switched telephone network, and the number displayed at the called party is the landline telephone number of this landline telephone communication unit 1032, rather than a local number of the mobile terminal 200.

With the voice gateway 100 provided by the embodiment of the present application, the mobile terminal 200 can still make or answer a call even in an area without mobile phone signal coverage, as long as the voice gateway 100 can be connected with the Internet.

In the embodiment of the present application, the mobile terminal 200 can carry out communication by means of the voice gateway 100. The voice gateway 100 is provided thereon with the communication module 103, and the mobile terminal 200 can select, from the voice gateway 100, a number desired to be used as the number for initiating communication. The mobile terminal 200 selects this number and initiates the voice or data service request, and the voice gateway 100 establishes, according to the voice or data service request initiated by the mobile terminal 200, communication with a called party or an external network via the communication module 103. In this way, the mobile terminal 200 can not only carry out voice or data service communication by using a local number, but also realize the voice or data service communication by means of the communication module 103 on the voice gateway 100. More communication modes are provided, which makes it possible to satisfy users' demands for more communication modes, thereby improving the user experience.

Preferably, the landline telephone communication unit 1032 communicates with the public switched telephone network through a foreign exchange office (FXO) interface, that is, the landline telephone communication unit can connect with the public switched telephone network (PSTN) via the FXO interface. The mobile phone communication unit 1031 includes a plurality of slots for SIM card, and different SIM cards can be inserted into such slots for SIM card, such that the voice gateway 100 may have different mobile telephone numbers.

The voice gateway 100 can establish communication with the public switched telephone network, the Public Internet and the mobile communication network, in which the public switched telephone network represents a traditional communication mode for landline telephones, and specifically, voice information and the like are transmitted via the public switched telephone network. In an embodiment of the present application, the mobile terminal and the voice gateway are connected with each other via the mobile communication network, where data such as the voice generated on a mobile phone communication link is transmitted via the mobile communication network. The voice gateway in the embodiment of the present application may be integrated with some functions necessary for a landline telephone, and can be installed with a plurality of subscriber identity modules, i.e. SIM cards. After the SIM cards are inserted into the voice gateway 100, the voice gateway can identify basic information of the SIM cards, and establish communication between these SIM cards and the Public Internet.

After establishing connection between each communication link and the external network, the voice gateway 100 can send number information of the telecommunication number corresponding to the communication link to the mobile terminal 200. The mobile terminal 200 can be associated in advance with the voice gateway 100 via Internet; and thus, based on such number information, the mobile terminal 200 can know the numbers existing on the voice gateway 100, and can select a desired number therefrom to carry out communication.

If there is a need to carry out communication, the mobile terminal 200 can select, from the received number information, one number as a first telecommunication number. Once it is selected, the mobile terminal 200 can use this first telecommunication number to initiate a voice or data service request. The outgoing-call interface presented on the mobile terminal 200 may be similar to an ordinary call-making interface, and the user may firstly select the first telecommunication number required for initiating communication, then input the called number to be called, and finally press a calling key, thereby generating a complete voice or data service request. The mobile terminal 200 only has to send this voice or data service request to the voice gateway 100.

After generating the voice or data service request, the mobile terminal 200 sends the voice or data service request to the voice gateway 100. The voice gateway 100 selects, according to the first telecommunication number included in the voice or data service request, a corresponding first communication link, and then can establish communication with the called party via the first communication link. The communication with the called party can be implemented via the mobile communication network, and the subsequent specific connection process with the called party is implemented by the operator providing service for the called party. The specific connection process belongs to the prior art, and is not limited here in the present application.

Before the voice gateway 100 according to the embodiment of the present application is used, a landline telephone number may be gained, through application, from the operator, for a landline telephone communication link of the voice gateway 100. Moreover, a plurality of SIM cards can be mounted in the voice gateway 100 and serve for mobile phone communication links of the voice gateway 100. The voice gateway 100 can identify the telecommunication numbers of all these communication links, establish communication between the individual communication links and the external network, and then send, after the identification, relevant number information to the mobile terminal 200 connected with the voice gateway 100. Thus, the mobile terminal 200 can get to know the individual communication links on the voice gateway 100, and then select, according to its own demands, one from these communication links to initiate the voice or data service request, and finally accomplish a call with the called party.

During use, a user may mount all the required SIM cards into the voice gateway 100, and complete the connection between the mobile terminal 200 and the voice gateway 100, in this way, all the SIM cards in the voice gateway 100 are available for the mobile terminal 200.

In an embodiment of the present application, the mobile terminal 200 can communicate with the outside by means of the voice gateway 100, and the voice gateway 100 can provide a plurality of different communication links, with all of these communication links available for the mobile terminal 200 connected with the voice gateway 100. That is to say, one mobile terminal 200 can use the plurality of different communication links on the voice gateway 100 to carry out communication. The communication options for the mobile terminal 200 is expanded to a greater extent by means of the voice gateway 100, and correspondingly, more options are provided for the mobile terminal 200 to carry out communication. That is, one mobile terminal 200 can use more numbers to carry out communication, which satisfies the requirement that the users want to use a plurality of different numbers.

Moreover, the voice gateway 100 can connect the mobile phone communication link with Internet, such that no existing communication network is used when the mobile terminal 200 uses the mobile phone communication link on the voice gateway 100 to carry out communication. Thus, no calling fee should be paid for the operator, which reduces the communication costs of the users and improves the user experience.

Furthermore, the communication module 103 may also include a network telephone (which may also be referred to as Voice over Internet Protocol (VOIP)) communication unit 1033 configured to connect with Public Internet, so as to achieve network telephone communication. The mobile terminal 200 may also use the network telephone communication unit 1033 on the voice gateway 100 to carry out network telephone communication.

VOIP (Voice over Internet Protocol) revolves digitalization of an analog signal (voice) and real-time transmission of this signal over the network in the form of a data packet. The greatest advantage of VOIP lies in that it can widely adopt the environment that Internet and global IPs are interconnected, and can provide more and better service over traditional business. VOIP can provide services, such as transmission of voice, fax, video and data, over IP network in an inexpensive way, for example, unified messaging service, virtual phone, virtual voice/fax mailbox, directory assistance service, Internet call center, Internet call management, teleconferencing and video conferencing, electronic commerce, facsimile storage and forwarding, storage and forwarding of various information, and so on, may be provided.

Furthermore, the communication module 103 is further configured to receive an incoming-call request directed against the voice gateway 100, and the terminal connection module 101 is further configured to forward the incoming-call request to the mobile terminal 200.

By using the voice gateway 100, the mobile terminal 200 can not only make an outgoing call, but also answer an incoming call from outside. In the case where an incoming call from other mobile terminals 200 is directed against the voice gateway 100, the communication module 103 receives this incoming-call request, and a mobile terminal 200 corresponding to the number associated with the received incoming-call request is obtained through analysis, then the incoming-call request can be transferred to this mobile terminal 200, thereby accomplishing the communication connection for the incoming-call request.

If no association relationship between the mobile terminal 200 and the numbers in the voice gateway 100 is set, when another terminal makes a call for one number in the voice gateway 100, the voice gateway would not get to know which mobile terminal 200 this call shall be transferred to.

The voice gateway 100 according to the embodiment of the present application can be connected with a plurality of mobile terminals 200, such that the plurality of mobile terminals 200 each can use more numbers to carry out communication. By establishing associated numbers as mentioned above, an incoming-call request from other terminals can be transferred to the mobile terminal 200 associated with the number, thereby accomplishing a complete communication process. For example, if a certain mobile terminal 200 set a certain telecommunication number on the voice gateway 100 as the associated number for this mobile terminal, all incoming calls for this associated number will be transferred to this mobile terminal 200, which would not lead to a circumstance where the call cannot get through.

If the voice gateway 100 determines that the mobile terminal 200 is being in communication, the voice gateway 100 would generate a prompting message for the incoming-call request directed against the mobile terminal 200, and return a call waiting message to the calling party.

Alternatively, the voice gateway 100 rejects this incoming-call request directed against the mobile terminal 200, and sends a prompting message to the mobile terminal 200.

In the embodiment of the present application, when the mobile terminal 200 is being in communication, and if the voice gateway 100 receives an incoming call for this mobile terminal 200, the voice gateway 100 can generate a prompting message to inform the mobile terminal 200. Accordingly, one dialogue box can be displayed on the display unit of the mobile terminal 200, to inform that there is an incoming call and query whether it will be answered; at the same time, the voice gateway 100 returns a call waiting message to the calling party, to inform the calling party that "this mobile terminal 200 is being in communication, please wait for a moment". The mobile terminal 200 can have the option to reject this incoming call and continue with the current communication, or have the option to hang up on the current communication and answer this incoming call.

On the other hand, if determining that the mobile terminal 200 is being in communication, the voice gateway 100 may also directly reject the incoming-call request directed against the mobile terminal 200, to assure that the current communication of the mobile terminal 200 is not interrupted. Accordingly, only a prompting message is generated to inform the mobile terminal 200 of an incoming call from another terminal, to avoid the omission of call information.

Preferably, the terminal connection module 101 may be connected with the mobile terminal 200 by using a wireless local area network, a General Packet Radio Service (GPRS) technology, Bluetooth, the third generation mobile communication technology (3G) or the fourth generation mobile communication technology (4G).

Furthermore, a memory 104 is further included, which is configured to store mobile phone number information of the mobile phone communication unit 1031 and landline telephone number information of the landline telephone communication unit 1032, and other information may also be stored, which is not limited in the present application.

Furthermore, a display module 105 is further included, which is configured to display at least one of phone number information stored in the memory 104 and information about the voice or data service request. Relevant information can be displayed through this display module 105, for facilitating the users to view.

Furthermore, a power supply module 106 is further included, which is configured to supply power to each of the processor 102, the communication module 103 and a network connection module. The power supply module 106 can supply power through a battery, or may also supply power through AC power. In the case where a battery is used for power supply, the voice gateway 100 may be applied in a wider range, as it can be carried around.

As described above, the memory may be, but not limited to, a random access memory (RAM), a read-only memory (ROM), a programmable read-only memory (PROM), an erasable programmable read-only memory (EPROM), an electrically-erasable programmable read-only memory (EEPROM) and the like. The memory is configured to store a program, and the processor executes the program after receiving an execution instruction. Methods executed by a server that is defined by a flow progress revealed by any embodiment of the present invention as described above can be applied to the processer, or be carried out by the processor.

The processor may be an integrated circuit chip and has the capacity of processing a signal. The above-mentioned processor may be a general purpose processor, including a central processing unit (which is called CPU for short), a network processor (which is called NP for short) and the like; moreover, it may also be a digital signal processor (DSP), an application-specific integrated circuit (ASIC), a field programmable gate array (FPGA) or other programmable logic devices, a discrete gate or transistor logic device, or a discrete hardware component. It may be used to implement or execute various methods, steps and logic block diagrams disclosed in the embodiments of the present invention. The general purpose processor may be a microprocessor, or this processor may also be any regular processor or the like.

In several embodiments provided in the present application, it shall be understood that the disclosed apparatus and method may also be implemented in other ways. The apparatus embodiments as described above are merely schematic. For example, the flow charts and block diagrams in the drawings show system architectures, functions and operations possibly implemented by the apparatuses, methods and computer program products according to a plurality of embodiments of the present invention. In this regard, each block in the flow charts or block diagrams can represent one module, a program segment or a part of code which contains one or more executable instructions for realizing a specified logic function. It shall also be noted that in certain alternative implementations, the functions indicated in the blocks may also occur in an order different from that indicated in the figures. For example, two successive blocks actually can be carried out substantially in parallel with each other, they sometimes may also be carried out in a reverse order, depending on the functions involved. It shall also be noted that each block in the block diagrams and/or flow charts and a combination of the blocks in the block diagrams and/or flow charts can be implemented by a specialized hardware-based system that executes a specified function or action, or can be implemented by a combination of a specialized hardware and computer instructions.

In addition, the individual function modules in the various embodiments of the present invention may be integrated together to form an independent part, or the individual modules may also exist on their own, or two or more modules may be integrated to form an independent part.

If being implemented in the form of a software function module and sold or used as a stand-alone product, the function may be stored in one computer-readable storage medium. On the basis of such understanding, the technical solution of the present invention substantively or a part thereof contributive to the prior art or a part of this technical solution may be embodied in the form of a software product, and this computer software product is stored in one storage medium, and includes several instructions for causing one computer device (it may be a personal computer, a server, a network device or the like) to carry out all or partial steps of the methods of the various embodiments of the present invention. The aforementioned storage medium includes a variety of media capable of storing program codes, such as a USB flash disk, a portable hard disk, a read-only memory (ROM), a random access memory (RAM), a diskette or an optical disk. It shall be clarified that, in the context, relational terms, such as first and second, are merely used to distinguish one entity or operation from another entity or operation, without necessarily requiring or implying that any of such actual relationships or sequences exists among these entities or operations. Moreover, terms such as "comprise", "contain" or any other variants thereof are intended to cover a non-exclusive inclusion, such that a process, a method, an article or a device including a series of elements include not only these elements, but also further elements that are not specifically listed, or further elements that are inherent to such a process, method, article or device. In the absence of more limitations, an element defined by a sentence "including a . . ." does not exclude the presence of additional same elements in the process, method, article or device that includes this element.

The above mentioned merely represent preferred embodiments of the present invention, and is not used to limit the present invention. For a person skilled in the art, various modifications and variations may be made to the present invention. Any amendments, equivalent substitutions, improvements and the like, which are made within the spirit and principle of the present invention, shall all be covered in the scope of protection of the present invention. It shall be noted that, similar reference signs and letters represent similar items in the following figures; and thus, once one certain item is defined in one figure, no further definitions or interpretations need to be made about this item in subsequent figures.

The foregoing is merely specific embodiments of the present invention, but the scope of protection of the present invention is not limited thereto. Any variations or substitutions, which would easily occur to a person skilled in the art who is familiar with the technical field within the technical scope disclosed in the present invention, shall be covered by the scope of protection of the present invention. Thus, the scope of protection of the present invention shall be defined by the scope of protection of the claims.

The invention claimed is:

1. A communication system, wherein a voice gateway is in communication with at least one mobile terminal, comprising:
   a mobile terminal connection module, which establishes communication with the mobile terminal;
   wherein the mobile terminal selects a number different than the local number of the mobile terminal and corresponding to a network communication module of the voice gateway for initiating a voice or data service request;
   a processor connected with the mobile terminal connection module which processes a voice or data service request initiated by the mobile terminal when making an outgoing call from the mobile terminal to an external network; and
   the network communication module connected with the processor which communicates, according to the voice or data service request, with the external network.

2. The communication system according to claim 1, wherein the network communication module comprises a mobile phone communication unit and a landline telephone communication unit,
   wherein the landline telephone communication unit is configured to establish communication with a public switched telephone network; and
   the mobile phone communication unit is configured to establish communication with a mobile communication network.

3. The communication system according to claim 2, wherein the landline telephone communication unit is configured to communicate with the public switched telephone network through a foreign exchange office (FXO) interface.

4. The communication system according to claim 2, wherein the mobile phone communication unit comprises a plurality of slots for subscriber identity module (SIM) cards.

5. The communication system according to claim 2, wherein the network communication module further comprises:
   a network telephone communication unit configured to connect with Public Internet, so as to realize network telephone communication.

6. The communication system according to claim 1, wherein the network communication module is further configured to receive an incoming-call request directed against the voice gateway; and the mobile terminal connection module is further configured to forward the incoming-call request to the mobile terminal.

7. The communication system according to claim 1, wherein the mobile terminal connection module is connected with the mobile terminal via a wireless local area network, Bluetooth or a mobile communication network.

8. The communication system according to claim 1, wherein the voice gateway further comprises:

a memory connected with the processor.

9. The communication system according to claim 8, wherein the voice gateway further comprises:

a display module connected with the processor and configured to display information stored in the memory.

10. The communication system according to claim 1, wherein the voice gateway further comprises:

a power supply module configured to supply power to each of the processor, the network communication module and a network connection module.

\* \* \* \* \*